United States Patent [19]

Fukuzaki

[11] Patent Number: 5,530,210

[45] Date of Patent: Jun. 25, 1996

[54] COORDINATE DETECTING DEVICE

[75] Inventor: Yasuhiro Fukuzaki, Saitama-ken, Japan

[73] Assignee: Wacom Co., Ltd., Saitama, Japan

[21] Appl. No.: 240,065

[22] Filed: May 9, 1994

[51] Int. Cl.⁶ .................................................. G08C 21/00
[52] U.S. Cl. ............................................................. 178/19
[58] Field of Search ........................ 178/18, 19; 345/173, 345/175; 321/5

[56] References Cited

U.S. PATENT DOCUMENTS

| | | | |
|---|---|---|---|
| 4,700,022 | 10/1987 | Salvador et al. | 178/19 X |
| 4,837,716 | 6/1989 | Chia-Hua | 178/19 X |
| 4,878,553 | 11/1989 | Yamanami et al. | |
| 4,999,461 | 3/1991 | Murakami et al. | 178/19 |

*Primary Examiner*—Stephen Chin
*Assistant Examiner*—Paul Loomis
*Attorney, Agent, or Firm*—Lowe, Price, LeBlanc & Becker

[57] ABSTRACT

There is disclosed a position detecting apparatus capable of operating with a high electric power efficiency, which can be configured only with digital circuits without analog switches. The position detecting apparatus includes a plurality of loop coils (2-1, 2-2, 2-3), and a plurality of three-state drivers (5-1, 5-2, 5-3) wherein one end of each loop coil is connected to corresponding one of three-state drivers. The other ends of the plurality of loop coils (2-1, 2-2, 2-3) are connected in common to a three-state driver (6). One of three-state drivers (5-1, 5-2, 5-3) is selected and connected to a NOR gate (4), while the other three-state drivers are maintained in a high impedance state, and the three-state driver (6) is grounded, whereby a signal generated by an oscillator (3) is applied to the selected loop coil so as to generate a radio wave. On the other hand, when the three-state driver (6) is in a high impedance state, it is possible to detect a voltage induced by a radio wave reflected from a position indicator (1).

6 Claims, 6 Drawing Sheets

THREE-STATE CONTROL (INPUT)

| INPUT | | OUTPUT |
|---|---|---|
| $\overline{OE}$ | A | Y |
| L | L | L |
| L | H | H |
| H | X | Z |

X : EITHER L OR H
Z : HIGH IMPEDANCE STATE

COORDINATE DETECTING DEVICE

DETAILED DESCRIPTION OF THE INVENTION

1. Field of the Invention

The present invention relates to an improved position detecting apparatus for detecting the coordinate value of the position indicated by a position indicator having a resonant circuit.

2. Description of the Related Arts

Prior to the present invention, the inventor of the present invention has proposed, in Japanese Patent Application No. 61-213970 (1986) (refer to Japanese Patent Application Laid-Open No. 63-70326 (1988)), having a specification generally corresponding to U.S. Pat. No. 4,878,553, a position detecting apparatus capable of detecting the coordinate value of the position indicated by a position indicator which has only a resonant circuit and which is not connected to any other elements.

In essence, the apparatus proposed in the patent application cited above detects a position in the following manner. One loop coil is selected from a group consisting of a plurality of loop coils disposed in a line along which the position is to be detected. An AC signal having a predetermined frequency is applied to the selected loop coil so that the selected loop coil may transmit a radio wave. A resonant circuit in the position indicator receives this radio wave. The resonant circuit, which has received the energy carried by the radio wave, then generates another radio wave. When this radio wave is received by the above-described loop coil, a voltage is induced in it. The above operation is performed repeatedly for the plurality of loop coils wherein each loop coil is selected one after another. The position of the resonant circuit, that is, the coordinate value of the position indicator, is determined based on the magnitudes of the voltages induced in loop coils.

PROBLEMS TO BE SOLVED BY THE INVENTION

In the position detecting apparatus according to the prior art, the greater the number of turns of each loop coil is, the more effective the transmission/reception operation of a radio wave is. In most cases, however, the loop coils are constructed by a conductive pattern formed on a sheet of printed circuit board so as to obtain better accuracy and to reduce the cost. In this case, the number of turns of each loop coil is limited to about two, and thus the impedance of each loop coil is limited to a few ohms, because all loop coils have to be closely disposed side by side or with some overlapping on one printed circuit board.

Furthermore, in the position detecting apparatus according to the prior art, an analog switch is used to switch the loop coils. However, since the analog switch has a rather large ON-impedance such as 20 Ω or greater, the greater part of electric power required during the transmission operation of a radio wave is dissipated by the analog switch. Thus, there is a problem that the electric power is not utilized efficiently.

Furthermore, if the power supply voltage for the analog switch is reduced, the ON-impedance will further increase, and thus the power efficiency will further decrease. For this reason, it is difficult to reduce the power supply voltage of the apparatus. Another problem is that the analog switch also needs a negative power supply in addition to a positive power supply, and thus a complicated large scale power supply circuit is required.

Furthermore, it would be desirable that all parts except for the loop coils be integrated into an application specific integrated circuit (ASIC). However, the analog switch is difficult to be integrated with the other parts.

It is an object of the present invention to provide a position detecting apparatus having advantages that: it may be constructed with only a digital circuit without using an analog switch; it may operate with a high power efficiency; it may operate at a lower power supply voltage; it may be driven with a single-polarity power supply; and it may be easily integrated.

MEANS FOR SOLVING THE PROBLEM

According to the present invention to achieve the above object, there is provided a position detecting apparatus for detecting the coordinate value of a position indicated by a position indicator by performing transmission and reception of a radio wave between the position indicator and a plurality of loop coils, the position indicator having a resonant circuit, the plurality of loop coils being disposed in parallel to each other along a line along which the position is to be detected; the apparatus comprising: a transmission circuit, the transmission circuit outputting a single-polarity pulse signal having a frequency nearly equal to the resonant frequency of the resonant circuit of the position indicator during a time period in which a radio wave is transmitted, the transmission circuit outputting signal ground during a time period in which a radio wave is received; a plurality of first switching circuits, each first switching circuit being connected to one end of a corresponding loop coil, each first switching circuit being capable of arbitrarily switching the connection state between a state in which the one end of the loop coil is connected to the transmission circuit and a state in which the one end of the loop coil is open; a second switching circuit, the second switching circuit being connected in common to the other ends of the plurality of loop coils, the second switching circuit being capable of arbitrarily switching the connection state between a state in which the other ends of the loop coils are connected in common to signal ground and a state in which the other ends of the loop coils are open; switching control means, the switching control means controlling one of the plurality of first switching circuits corresponding to a loop coil which should transmit a radio wave such that the loop coil may be connected to the transmission circuit during a time period in which a radio wave is transmitted, the switching control means controlling the other first switching circuits such that the other first switching circuits may be in open states during the same time period in which the radio wave is transmitted, the switching control means controlling one of the plurality of first switching circuits corresponding to a loop coil which should receive a radio wave such that the loop coil may be connected to the transmission circuit during a time period in which a radio wave is received, the switching control means controlling the other first switching circuits and the second switching circuit such that the other first switching circuits and the second switching circuit may be in open states during the same time period in which the radio wave is received; a reception circuit, the reception circuit being connected to the other ends of the plurality of loop coils, the reception circuit detecting voltages induced in the plurality of loop coils; and coordinate calculation means for calculating the coordinate value of the position indicated by the position indicator from voltages induced in the plurality of loop coils.

OPERATION

According to the present invention, during a radio wave transmission time period, one end of a loop coil selected from the plurality of loop coils is connected to the transmission circuit via a corresponding first switching circuit, and the other end is connected to the signal ground via the second switching circuit so that a current may flow through this selected loop coil toward the signal ground due to a single-polarity pulse signal generated by the transmission circuit, whereby the selected loop coil generates a radio wave having a frequency nearly equal to the resonant frequency of the position indicator. In the above operation state, one end of each remaining loop coil of the plurality loop coils is made open by a corresponding first switching circuit, and the other ends are connected to the signal ground via the second switching circuit so that there is neither current flowing through any of these loop coils nor radio wave being generated by any of these loop coils. That is, only the loop coil selected by the plurality of first switching circuits may generate a radio wave. The other ends of the plurality of loop coils are connected in common to the reception circuit, however all these ends are connected to the signal ground so that the single-polarity pulse signal may not be detected.

During a radio wave reception period, one end of a loop coil selected from the plurality of loop coils is connected to the signal ground via a corresponding first switching circuit, and the other end is made open by the second switching circuit so that a voltage may be induced in the selected loop coil relative to the signal ground by a radio wave reflected from the resonant circuit of the position indicator. The induced voltage is detected by the reception circuit. In this operation state, one end of each remaining loop coil of the plurality loop coils is made open by a corresponding first switching circuit, and the other ends are made open by the second switching circuit so that no voltage may be induced in any of these loop coils. That is, only the voltage induced in the loop coil selected by the plurality of first switching circuits may be detected.

The manner of switching the plurality of loop coils to select one of them during a radio wave transmission or reception period, and the manner of calculating the coordinate value of the position indicated by the position indicator from the induced voltages which have been detected in the reception period are similar to those disclosed in the previously-filed Patent Application cited above and also in related Patent Applications.

EMBODIMENTS

Figure 1:
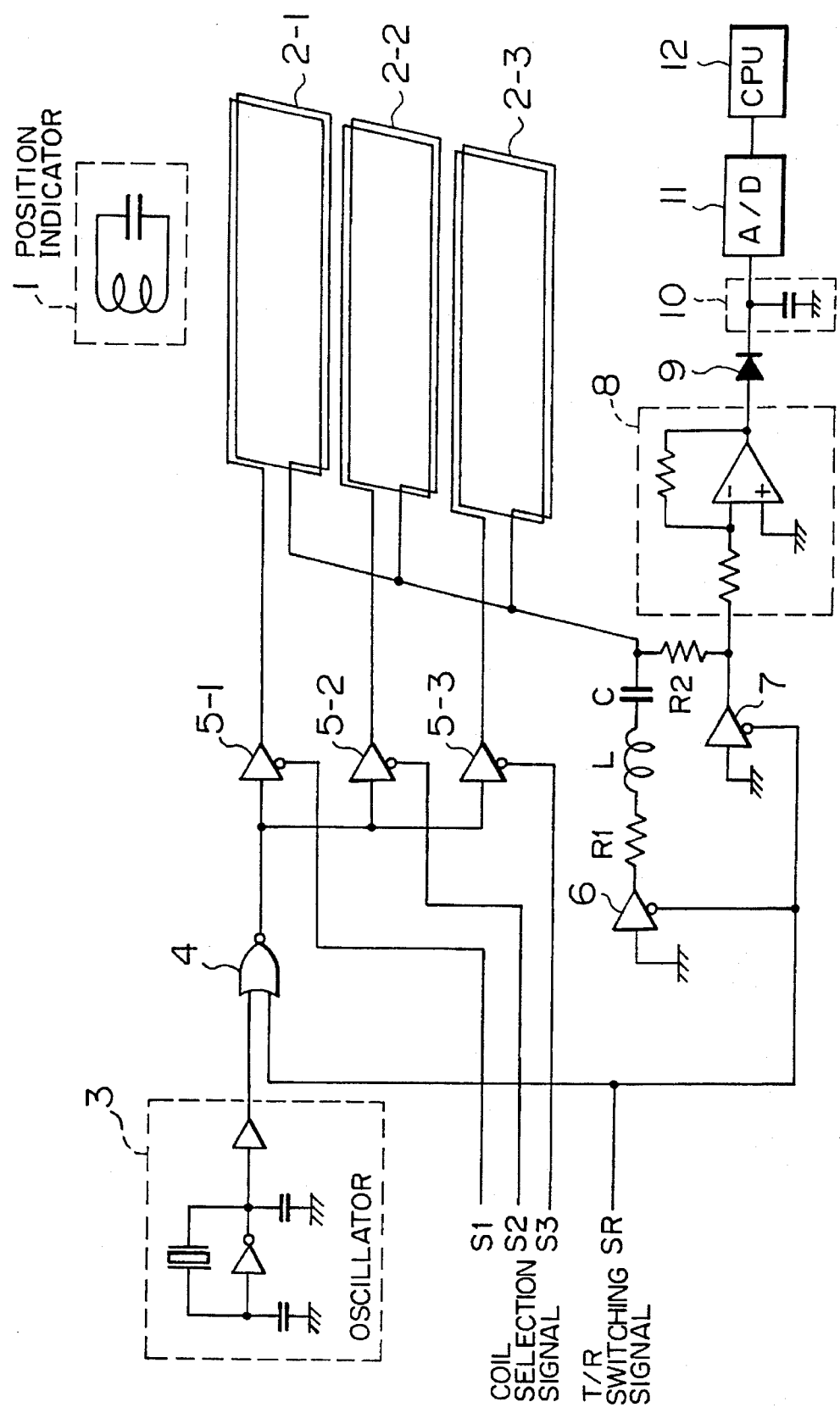
FIG. 1 is a schematic representation of the configuration of a first embodiment of a position detecting apparatus according to the present invention.

FIG. 1 illustrates a first embodiment of a position detecting apparatus according to the present invention. As shown in FIG. 1, the position detecting apparatus comprises a position indicator 1, loop coils 2-1, 2—2, 2-3, an oscillator 3, a NOR gate, three-state drivers 5-1, 5-2, 5-3, 6, 7, an amplifier 8, a detector 9, a peak hold circuit 10, analog-to-digital (A/D) converter 11, a central processing unit (CPU) 12, resistors R1, R2, an inductor L, and a capacitor C.

The position indicator 1 comprises a well-known resonant circuit having a resonant frequency, for example fo, which includes a coil and a capacitor, wherein the position indicator 1 may move to an arbitrary position in response to the operation of an operator.

The loop coils 2-1, 2—2, 2-3 are disposed in substantially parallel along a line along which the position is to be detected. One end of each loop coil is connected to the output of a corresponding three-state driver 5-1, 5-2, or 5-3. The other end of each loop coil is connected in common to the output of the three-state driver 6 via the resistance R1, the inductor L, and the capacitor C, and also connected in common to the amplifier 8 via the resistor 2.

The oscillator 3 generates a single-polarity pulse signal having a predetermined frequency fo, which is applied to one input of the NOR gate 4. The other input of the NOR gate 4 is supplied with a transmission/reception switching signal SR which indicates time periods during which a radio wave should be transmitted or received. During a transmission time period, the single-polarity pulse signal appears at the output of the NOR gate 4. During a reception time period, a low-level signal appears at the output of the NOR gate 4, that is, the output of the NOR gate 4 is kept at a signal ground level.

Inputs of the three-state drivers 5-1, 5-2, 5-3 are connected in common to the output of the NOR gate 4. Loop coil selection signals S1, S2, and S3 are applied to control inputs of the respective three state drivers 5-1, 5-2, and 5-3. The input of the three-state driver 6 is grounded, and its control input is supplied with the transmission/reception switching signal SR. The input of the three-state driver 7 is also grounded, and its control input is supplied with the transmission/reception switching signal SR. The output of the three-state driver 7 is connected to a node which connects the amplifier 8 and the other ends of the loop coils 2-1, 2—2, 2-3, (more rigidly representing, the node connects the amplifier 8 and the resistor R2).

Figure 2:
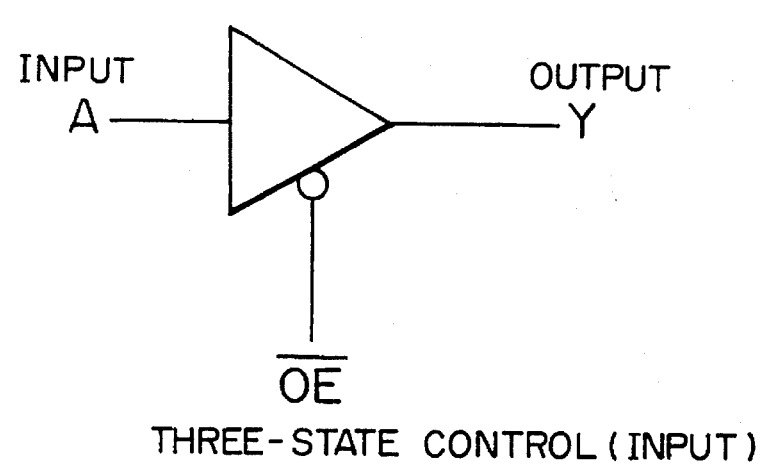
FIG. 2 is a schematic diagram illustrating a relationship between input and output of a three-state driver.

The three-state driver is a well-known digital circuit which has a high impedance output state in which its output is open, as well as normal states in which a high-level or low-level output signal is provided via its output. When a low-level signal is applied to the control input, the input signal directly appears at its output terminal. When a high-level signal is applied to the control input, the output is maintained in a high-impedance state. Detailed relationships between input and output signals of the three-state driver are shown in FIG. 2.

The amplifier 8 is a well known summing amplifier comprising an operational amplifier and resistors. The amplifier 8 amplifies a voltage induced in one loop coil which is selected in a manner described later from the loop coils 2-1, 2—2, 2-3, and then transmits the output signal to the detector 9. The detector 9 comprises a well-known diode, which detects and rectifies the induced voltage and then transmits the resultant signal to the peak hold circuit 10. The peak hold circuit 10 comprises a well-known capacitor, which holds a peak value of the induced voltage which has been detected and rectified. The A/D converter 11 converts the output of the peak hold circuit 10 from an analog form to a digital form and then transmits the result to the central processing unit (CPU) 12.

The CPU 12 generates a transmission/reception switching signal SR and coil selection signals S1–S3, and then supplies these signals to various elements in the apparatus. The CPU 12 also calculates the coordinate value which corresponds to a position indicated by the resonant circuit of the position indicator 1, based on the induced voltages which have been converted into digital values corresponding to respective loop coils 2-1, 2—2, 2-3.

The resistor R1 is a current limiting resistor for preventing an overcurrent from flowing through the three-state drivers 5-1, 5-2, 5-3 during a time period in which a radio wave is transmitted. The resistor R2 is used to limit a current which flows toward the three-state driver 7 and toward the amplifier 8 to a possible low value during a time period in which a radio wave is transmitted, wherein resistances are set such that R2>R1. The three-state driver 7 prevents a current from flowing directly into the amplifier 8 during a time period in which a radio wave is transmitted. However, the three-state driver 7 is not necessarily essential.

The inductor L and the capacitor C change the waveform of a single-polarity pulse signal, which is generated by the oscillator 3 during a time period in which a radio wave is transmitted, to a more gradual waveform, thereby generating a radio wave having a waveform similar to a sinusoidal waveform. The energy stored in the inductor L and the capacitor C gives rise to a reverse current flowing through a loop coil when the single-polarity pulse signal falls to a low level (ground level). The inductance of the inductor L and the capacitance of the capacitor C are determined such that the resonant frequency of a loop including the inductor L and the capacitor C in a transmission period becomes equal to the frequency of the single-polarity pulse signal.

The above-described oscillator 3 and the NOR gate 4 form a transmission circuit defined in Claim 1. The three-state drivers 5-1, 5-2, 5-3 form a first switching circuit defined in Claim 1, and the three-state driver 6 forms a second switching circuit defined in Claim 1. The three-state driver 7 forms a third switching circuit defined in Claim 5. The amplifier 8, the detector 9, the peak hold circuit 10, and the A/D converter 11 form a reception circuit defined in Claim 1. The CPU 12 forms switching control means and coordinate calculation means defined in Claim 1. The inductor L and the capacitor C form an LC circuit defined in Claim 3 or 4.

Figure 3:
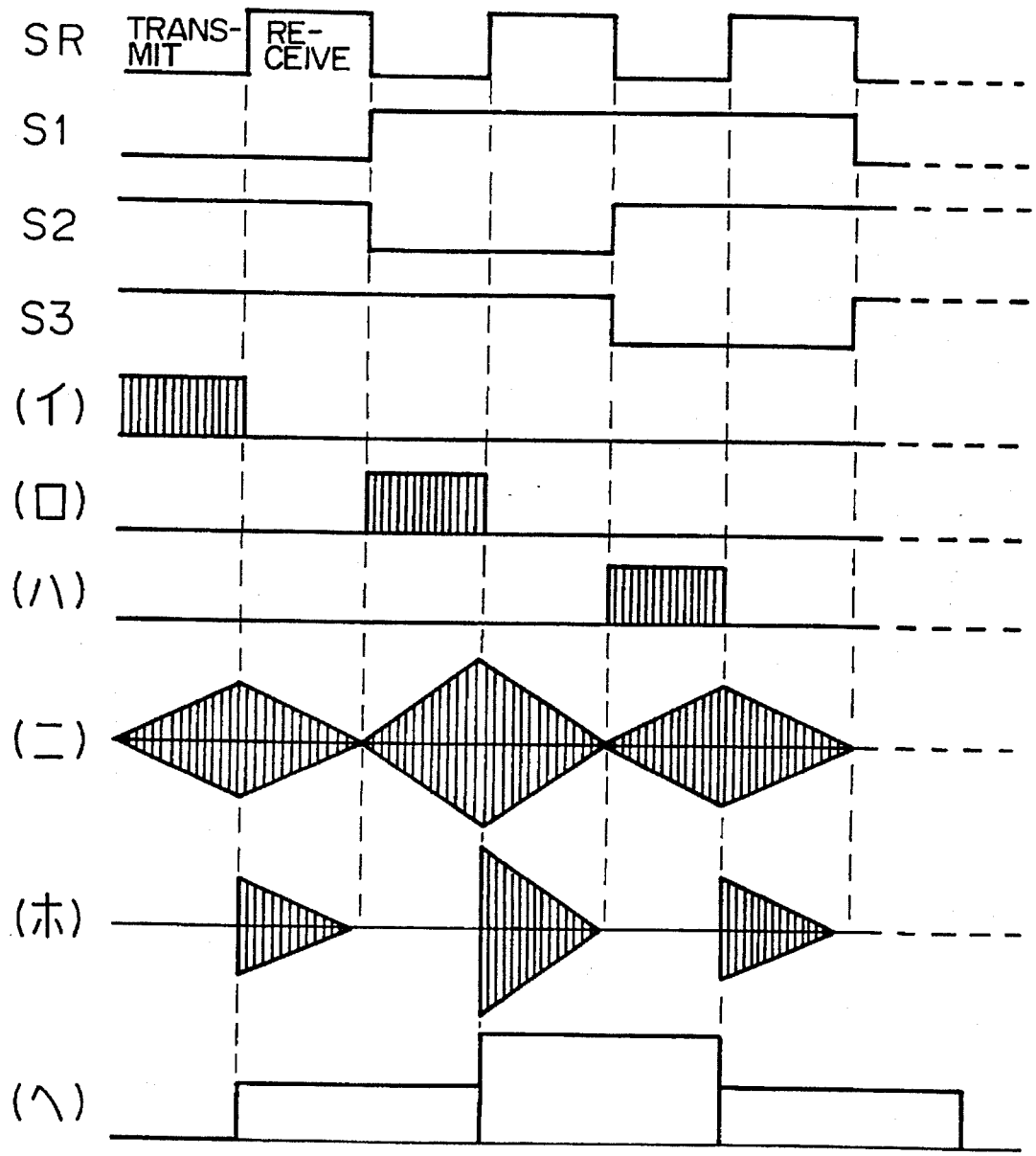
FIG. 3 is a schematic diagram illustrating an example regarding waveforms at various portions of the first embodiment.

FIG. 3 illustrates an example regarding signal waveforms at various elements of the present embodiment. In FIG. 3, it is assumed that the position indicator 1 is located near the loop coil 2—2. In the figure, SR denotes a transmission/reception switching signal, and S1, S2, S3 denote coil selection signals. ( ↓ ), ( □ ), and ( ∧ ) denote radio waves transmitted by loop coils 2-1, 2—2, and 2-3, respectively. ( ∼ ) denotes a voltage induced in the resonant circuit of the position indicator 1. ( ✳ ) denotes a reception signal, and ( ⌒ ) denotes a peak hold waveform of the reception signal.

Referring to FIG. 3, the operation of the present embodiment will be described below.

If the transmission/reception switching signal SR is at a low level during a transmission period, the coil selection signal S1 is at a low level, and the coil selection signals S2 and S3 are at a high level, then the NOR gate 4 becomes open, the three-state drivers 5-1, 6, 7 transfer their input signals directly to their outputs, and the three-state drivers 5-2, 5-3 goes to a state in which their outputs are at a high impedance, that is, they are open.

In this situation, a single-polarity pulse signal is supplied to the loop coils 2-1 by the oscillator 3 via the NOR gate 4 and the three-state driver 5-1, and a current corresponding to the single-polarity pulse signal flows through the loop coil 2-1 toward the signal ground which is connected to the loop coil 2-1 via the three-state driver 6 (a small amount of current also flows toward the signal ground which is connected to the loop coil 2-1 via the three-state driver 7). As a result, a radio wave having a frequency corresponding to the frequency of the single-polarity pulse signal, that is, a radio wave having a frequency equal to the resonant frequency fo of the resonant circuit of the position indicator 1, is generated. The radio wave generated by the loop coil 2-1 is received by the resonant circuit of the position indicator 1 wherein the resonant circuit is tuned for the radio wave, and an induced voltage ( ∼ ) is generated in the resonant circuit.

On the other hand, no currents flow through the other loop coils 2—2 and 2-3, and thus no radio waves are generated by them, since the corresponding three-state drivers 5-2 and 5-3 are in an open state (( □ ), ( ∧ )). Since the input of the amplifier 8 is connected to the signal ground via the three-state drivers 6 and 7, no induced voltage is detected at its output ( ✳ ).

In a radio waver reception period, if the transmission/reception switching signal SR rises to a high level while the coil selection signals S1–S3 remain unchanged, then the NOR gate 4 is closed, and the three-state driver 5-1 transfers its input signal to its output, and the outputs of the three-state drivers 5-2, 5-3, 6, 7 go to an open state.

In this situation, one end of the loop coil 2-1 is connected via the three-state driver 5-1 to the output of the NOR gate 4, that is the signal ground. On the other hand, as for the other loop coils 2—2, 2-3, one end of each coil is made open by the three-state drivers 5-2 or 5-3, and the other end of each coil is made open by the three-state drivers 7 or 7. Generation or reflection of a radio wave occurs due to the voltage (D) induced in the resonant circuit of the position indicator 1. This radio wave induces a voltage ( ✳ ) only in the loop coil 2-1 wherein the induced voltage has a frequency nearly equal to its resonant frequency fo.

The induced voltage ( ✳ ) is amplified by the amplifier 8, and then detected and rectified by the detector 9. Furthermore, its peak value is held by the peak hold circuit 10 ( ⌒ ), and converted to a digital value by the A/D converter 11. The resultant value is sent to the CPU 12.

In the subsequent radio wave transmission period during which the transmission/reception switching signal SR is at a low level the coil selection signals S1 and S3 are at a high level, and the coil selection signal S2 is at a low level, only the loop coil 2—2 generates a radio wave. Then, the radio wave is transmitted and received in a manner similar to that in the previous case wherein switching occurs according to the transmission/reception switching signal and the coil selection signals S1–S3, whereby a voltage induced in each loop coil 2-1, 2—2, 2-3 is provided to the CPU 12.

The voltage induced in each loop coil 2-1, 2—2, 2-3 depends on the distance between each loop coil 2-1, 2—2, 2-3 and the resonant circuit of the position indicator 1 wherein a smaller distance results in a larger induced voltage. Therefore, the value extracted as the induced voltage from the loop coil 2-1, 2—2 or 2-3 has a maximum value for the loop coil which is the nearest to the position indicated by *the position indicator 1, and the voltage decreases as the distance of the loop coil relative to the position of the position indicator increases. The above values of induced voltages are processed by the CPU 12 so as to determine a position at which the voltage distribution has a maximum value thereby determining a coordinate value of a position indicated by the position indicator 1.

According to the first embodiment, as described above, one of loop coils 2-1, 2-1, 2-3 is selected by using three-state drivers, and a single-polarity pulse signal is applied to the selected loop coil so as to transmit a radio wave. The radio wave is reflected from the resonant circuit of the position indicator 1, and a voltage induced by the reflected radio wave is detected. Unlike the conventional technique using an analog switch, unnecessary power consumption does not occur during a time period for transmission of a radio wave. Thus, the present embodiment provides a position detecting apparatus which can operate with a higher power efficiency at a lower power supply voltage with a simple power supply circuit without a negative power supply. Furthermore, since no analog elements are required, all elements except for loop coils can be integrated in an ASIC. The LC circuit disposed in series to a loop coil makes it possible to generate a radio wave having a waveform similar to a sinusoidal waveform, whereby it becomes possible to transmit and receive a radio wave having less harmonic components at a higher signal-to-noise ratio. Furthermore, the three-state driver 7 prevents a current from flowing directly into the amplifier 8 during a time period for transmission of a radio wave, thereby preventing unnecessary power consumption in the amplifier 8.

Figure 4:
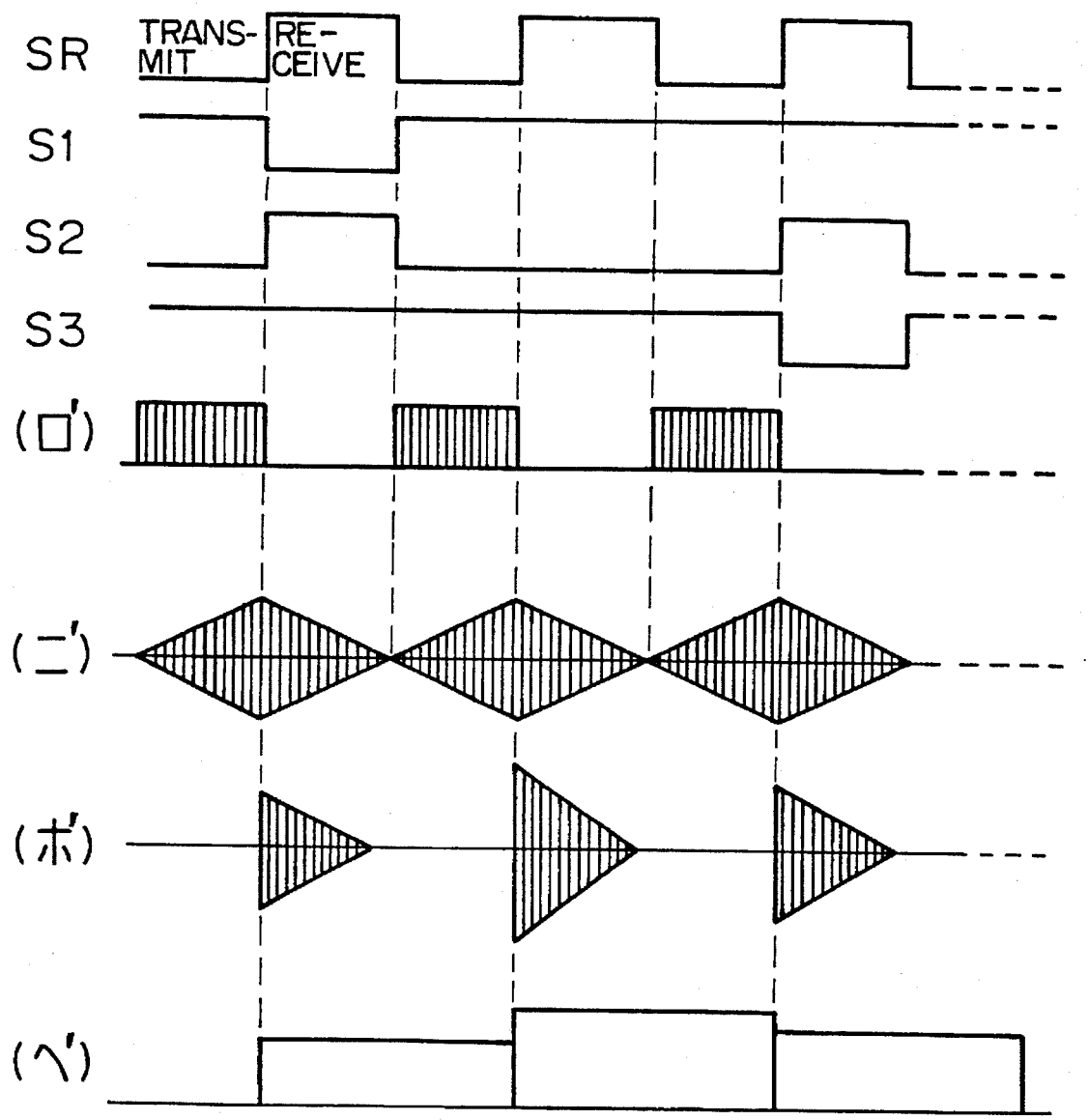
FIG. 4 is a schematic diagram illustrating another example regarding waveforms at various portions of the first embodiment.

FIG. 4 illustrates another example regarding signal waveforms at various elements of the first embodiment. In this example, a radio wave is transmitted by a predetermined loop coil wherein a loop coil nearest to the resonant circuit 1 is usually selected for this purpose (the loop coil 2—2 in this case), and loop coils are sequentially switched and selected only during a receiving period. In FIG. 4, SR denotes a transmission/reception switching signal, and S1, S2, S3 denote coil selection signals. B denotes a radio wave transmitted by the loop coil 2—2. (=)' denotes a voltage induced in the resonant circuit of the position indicator 1. (✱)' denotes a reception signal, and (∧)' denotes a peak hold waveform of the reception signal.

The transmission/reception switching signal is similar to that shown in FIG. 3. The coil selection signals S1–S3 are also similar to those shown in FIG. 3 except that the selection signal S2 is at a low level during every transmission period. Since a radio wave is transmitted by a fixed loop coil, the level of the induced voltage (=)' is constant. The reception signal waveform (✱)' and the peak hold waveform F' are basically similar to those shown in FIG. 3. The loop coil used to transmit a radio wave is switched with movement of the position indicator 1.

This method of selecting a loop coil described in connection with FIG. 4 requires knowledge of a rough position of the resonant circuit 1. Therefore, this method cannot be solely used. If the position of the resonant circuit 1 is not known at all as in the case where the position detecting apparatus has been just started, another method such as that shown in FIG. 3 is used first, and subsequently the method shown in FIG. 4 is used. However, the present invention is not essential in the order of coil selection, but in the method of selecting a coil from a plurality of coils and in the method of driving the selected coil and detecting a voltage induced in the selected coil.

Figure 5:
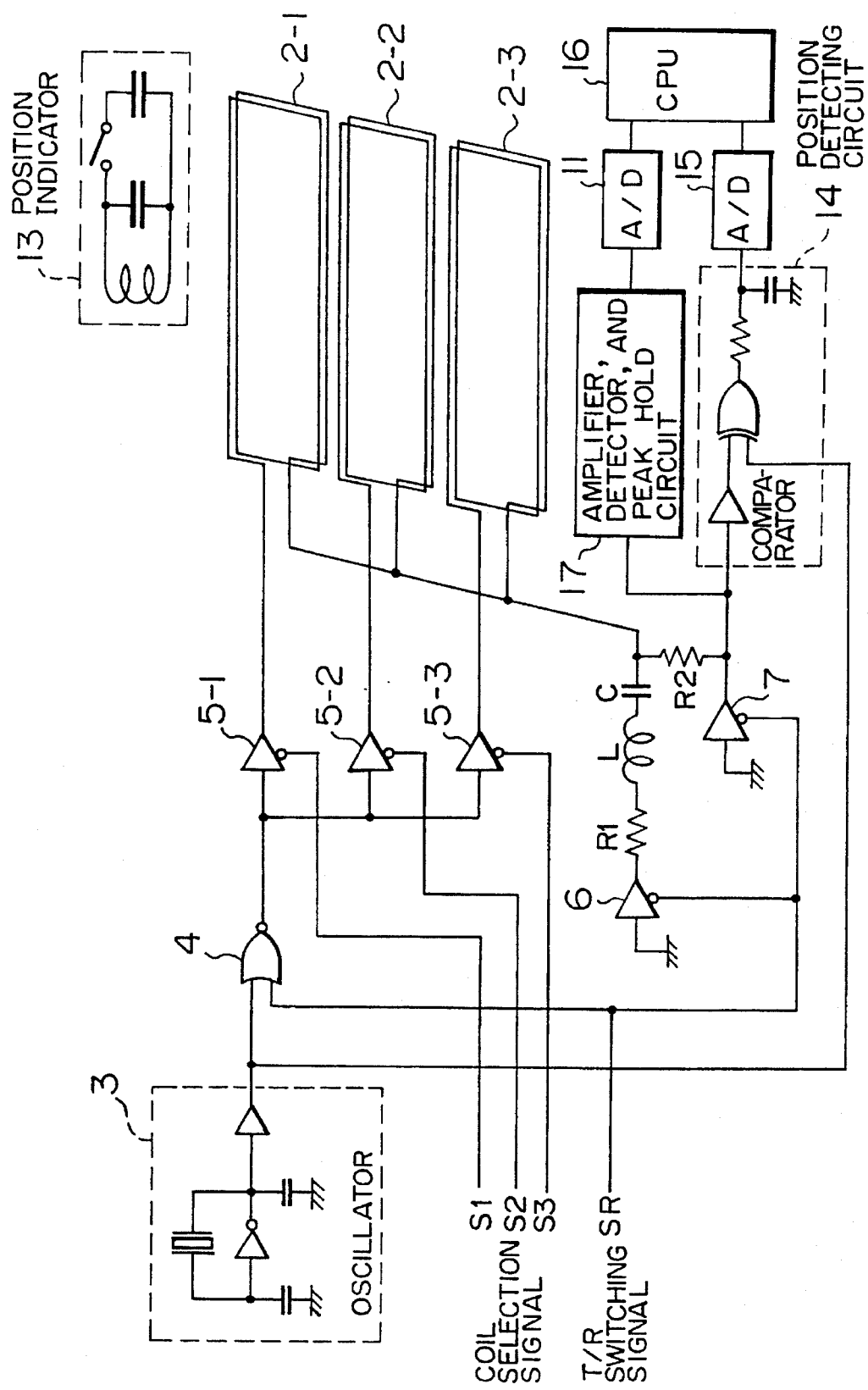
FIG. 5 is a schematic representation of the configuration of a second embodiment of a position detecting apparatus according to the present invention.

FIG. 5 illustrates a second embodiment of a position detecting apparatus according to the present invention. This embodiment is arranged such that certain operation states regarding the position indicator of the first embodiment, for example a state in which a position to be actually input is specified (pen-down state), may be detected.

As shown in FIG. 5, the apparatus includes a position indicator 13 comprising a resonant circuit including a coil, a capacitor which is connected directly to the coil, and another capacitor which is connected in parallel to the coil via a switch, wherein the resonant frequency changes slightly relative to a predetermined frequency for example fo when the above switch is turn on or off.

The apparatus also includes a phase detector 14 comprising a comparator (waveform shaping circuit), an EXOR gate, a resistor, and a capacitor. When a switching operation of the position indicator 13 creates a phase difference between a received signal and a single polarity pulse signal generated by an oscillator 3 (transmitted signal), the EXOR gate generates an output signal representing the phase difference, which is integrated by the capacitor and the resistor. Thus, the result is output in a DC signal form.

Furthermore, the apparatus includes an analog-to-digital (A/D) converter 15 which converts the output of the phase detector 14 from an analog form to a digital form, and transmits the result to a central processing unit (CPU) 16. In addition to the same functions as those of the CPU 12 in the first embodiment, the CPU 16 also has a function to detect a pen-down state of the position indicator 13 from the phase difference between the received and transmitted signals which have been converted into digital values by the A/D converter 15.

Reference numeral 17 is a simplified representation including an amplifier, a detector, and a peak hold circuit which are equivalent to the amplifier 8, the detector 9, and the peak hold circuit 10 shown in FIG. 1. The other elements and functions associated with these elements are the same as those in the first embodiment.

In the second embodiment, the resonant frequency of the resonant circuit is changed according to predetermined operation states of the position indicator. The change in the resonant frequency is detected as the phase difference in a received signal thereby detecting the operation state. Alternatively, the loss of the resonant circuit may also be changed, and the resulting attenuation ratio of a received signal may be detected thereby detecting the state. Otherwise, the state may also be detected by detecting the time-dependent variation in the phase or amplitude of the signal. In this case, the amount of the variation may also have specific meanings, and the digital data may also be sent in the form of a time series. Furthermore, the frequency of a radio wave generated by a loop coil may also be changed such that it follows the change in the resonant frequency of the resonant circuit of the position indicator, thereby the operation state may be detected by detecting the amount of the frequency change.

Figure 6:
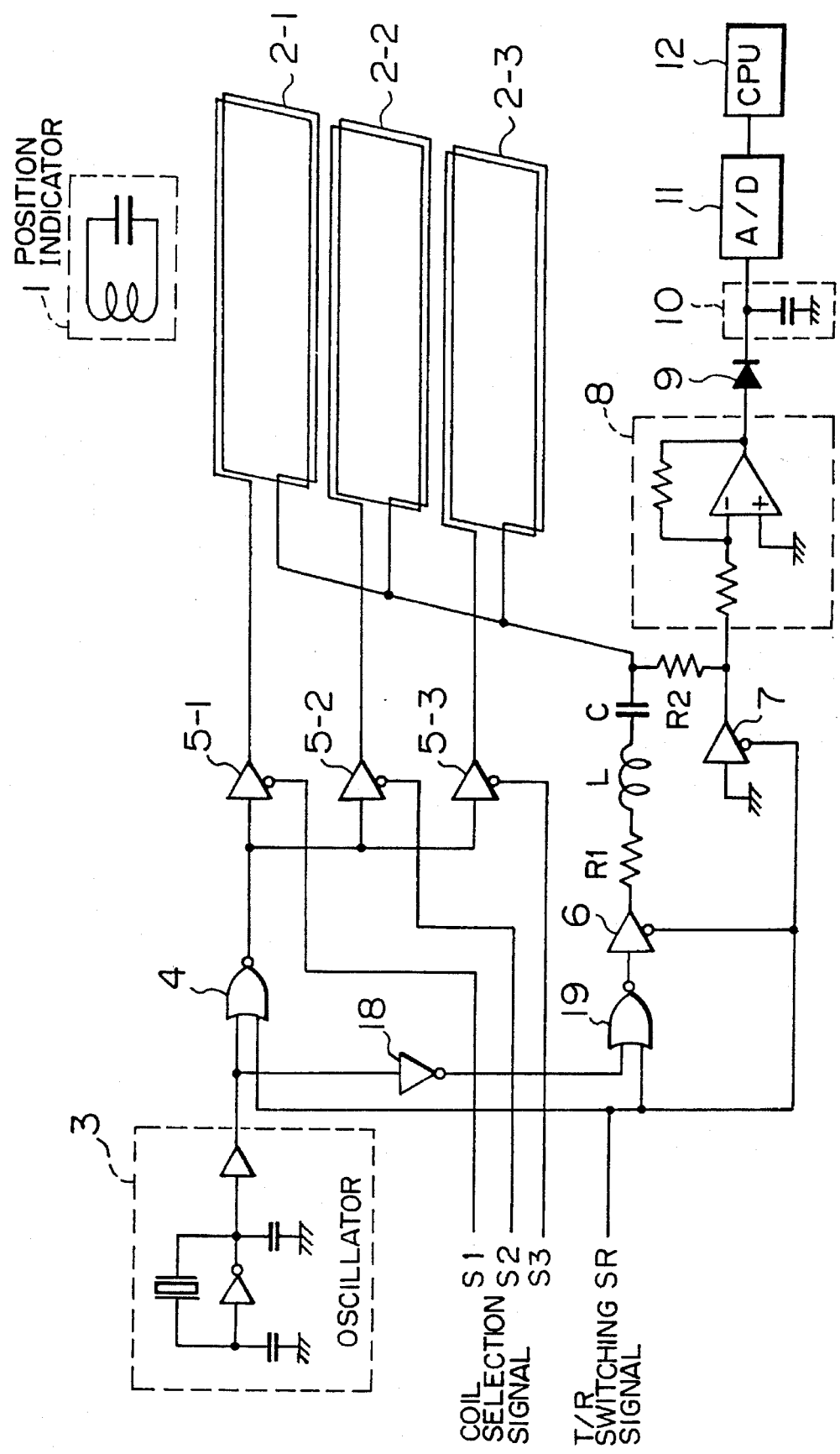
FIG. 6 is a schematic representation of the configuration of a third embodiment of a position detecting apparatus according to the present invention.

FIG. 6 illustrates a third embodiment of a position detecting apparatus according to the present invention, which is modified from the first embodiment such that phase-inverted single-polarity pulse signal is applied to the other end of a loop coil so as to make a reverse current flow through the loop coil.

As shown in FIG. 6, the apparatus includes an inverter 18 which receives an input signal consisting of a single-polarity pulse signal generated by an oscillator 3, and generates a phase-inverted output signal whose phase is inverted relative to the received single-polarity pulse signal. The apparatus also includes a NOR gate 19 which receives the phase-inverted signal at its one input, and receives a transmission/reception switching signal at the other input. During a radio wave transmission period, the NOR gate 19 provides a phase-inverted signal of the single-polarity pulse signal at its output. During a radio wave reception period, the NOR gate 19 provides a low-level output signal, that is, the output is maintained at a signal ground level. The output of the NOR 19 is connected to the input of a three-state driver 6.

This embodiment is configured in the same manner as in the first or second embodiment in that during a radio wave transmission period in which the single-polarity pulse signal is maintained at a high level, the other end of a loop coil which should transmit a radio wave is maintained at a low level (ground level). However, during a period in which the single-polarity pulse signal is at a low level, the other end of the loop coil which should transmit a radio wave is maintained at a high level, so that a sufficiently large current may flow toward one end from other end of the loop coil regardless of the amount of energy stored in the LC circuit, thereby effectively transmitting a radio wave. The other elements and the functions associated with these elements are the same as in the first embodiment.

The inverter 18 and the NOR gate 19 form a second transmission circuit defined in Claim 6. This embodiment may also be arranged such that predetermined operation states of the position indicator may be detected as in the first embodiment.

In this embodiment, a plurality of loop coils are disposed apart from each other. However, loop coils may also be disposed such that they overlap each other. The number of loop coils shown in the above embodiments is just an example, and an arbitrary number of loop coils may be used. In the above-described embodiments, the position in one direction can be detected. However, positions in two directions which are perpendicular to each other may also be detected if similar sets of loop coils are disposed in the directions perpendicular to each other, and if there are provided switching circuits similar to that described above and the other portion of the circuit described above is switched so that positions may be detected alternately.

ADVANTAGES OF THE INVENTION

As described above, in the first aspect of the present invention which is defined in Claim 1, a position detecting apparatus comprises: a transmission circuit, the transmission circuit outputting a single-polarity pulse signal having a frequency nearly equal to the resonant frequency of the resonant circuit of the position indicator during a time period in which a radio wave is transmitted, the transmission circuit outputting signal ground during a time period in which a radio wave is received; a plurality of first switching circuits, each first switching circuit being connected to one end of a corresponding loop coil, each first switching circuit being capable of arbitrarily switching the connection state between a state in which the one end of the loop coil is connected to the transmission circuit and a state in which the one end of the loop coil is open; and a second switching circuit, the second switching circuit being connected in common to the other ends of the plurality of loop coils, the second switching circuit being capable of arbitrarily switching the connection state between a state in which the other ends of the loop coils are connected in common to signal ground and a state in which the other ends of the loop coils are open; wherein one of the plurality of first switching circuits corresponding to a loop coil which should transmit a radio wave makes a connection to the transmission circuit during a radio wave transmission period, while the other first switching circuits are maintained in open states and the second switching circuit is connected to the signal ground during the above transmission period, and wherein one of the plurality of first switching circuits corresponding to a loop coil which should receive a radio wave makes a connection to the transmission circuit during a radio wave reception period, while the other first switching circuits and the second switching circuit are maintained in open states during the above reception period, whereby a single-polarity pulse signal may be applied only to one loop coil so as to make the loop coil transmit a radio wave during a radio wave transmission period, and the radio wave reflected from the resonant circuit of the position indicator may be received thereby detecting an induced voltage. In this arrangement, unlike a conventional apparatus using an analog switch, unnecessary consumption of electric power during a radio wave transmission period does not occur, and thus it is possible to effectively use electric power. It is also possible to reduce the power supply voltage. Furthermore, a negative power supply becomes unnecessary, and thus it is also possible to employ a simplified power supply.

In the second aspect of the present invention as defined in Claim 2, the plurality of first switching circuits as well as the second switching circuit comprise three-state drivers, whereby analog circuit elements become unnecessary and thus it becomes possible to integrate all circuit elements except for loop coils in an ASIC.

In the third aspect of the present invention as defined in Claim 3, there is provided an LC circuit connected in series to loop coils thereby generating a radio wave having a waveform similar to a sinusoidal waveform containing little harmonic components. As a result, it is possible to transmit and receive a radio wave at a high signal-to-noise ratio.

In the fourth aspect of the present invention as defined in Claim 4, the parameters of the LC circuit are set such that the resonant frequency of a loop including the LC circuit associated with a transmission time period may be equal to the frequency of the single-polarity pulse signal, thereby achieving high efficiency transmission and reception of a radio wave.

In the fifth aspect of the present invention as defined in Claim 5, there is further provided a third switching circuit, the third switching circuit being connected to the node which connects the other ends of the plurality of loop coils to the reception circuit, the third switching circuit being capable of arbitrarily switching the connection state between a state in which the node is connected to the signal ground and a state in which the; node is open, the third switching circuit being switched in the same control manner as the second switching circuit, whereby no current flows directly into the reception circuit during a radio wave transmission period and thus the reception circuit does not dissipate unnecessarily electric power.

In the sixth aspect of the present invention as defined in Claim 6, there is further provide a second transmission circuit, the second transmission circuit outputting a signal whose phase is inverted relative to that of the single-polarity pulse signal during a radio wave transmission period, the second transmission circuit outputting signal ground during a radio wave reception period, wherein the second switching circuit may switch the connection state between a state in which the second switching circuit makes a connection to the second transmission circuit and a state in which the second switching circuit is open.

Reference Numerals 1,13: Position Indicator
2-1, 2—2, 2-3: Loop Coil
3: Oscillator
4,19: NOR Gate
5-1, 5-2, 503, 6, 7: Three-State Driver
8: Amplifier
9: Detector
10: Peak Hold Circuit
11,15: Analog-to-Digital (A/D) Converter
12,16: Central Processing Unit
14: Phase Detector
17: Amplifier, Detector, and Peak Hold Circuit
18: Inverter
R1,R2: Resistor
L: Inductor
C: Capacitor

I claim:

1. A position detecting apparatus for detecting a coordinate value of the position indicated by a position indicator by performing transmission and reception of a radio wave between the position indicator and a plurality of loop coils, said position indicator having a resonant circuit, said plurality of loop coils being disposed in parallel to each other along a line along which the position is to be detected; said apparatus comprising:

a transmission circuit, said transmission circuit outputting a single-polarity pulse signal having a frequency nearly equal to the resonant frequency of the resonant circuit of the position indicator during a time period in which a radio wave is transmitted, said transmission circuit outputting signal ground during a time period in which a radio wave is received;

a plurality of first switching circuits, each first switching circuit being connected to one end of a corresponding loop coil, catch first switching circuit being capable of arbitrarily switching the connection state between a state in which said one end of the loop coil is connected to said transmission circuit and a state in which said one end of the loop coil is open;

a second switching circuit, said second switching circuit being connected in common to the other ends of the plurality of loop coils, said second switching circuit being capable of arbitrarily switching the connection state between a state in which the other ends of the loop coils are connected in common to the signal ground and a state in which the other ends of the loop coils are open;

switching control means, said switching control means controlling one of the plurality of first switching circuits corresponding to a loop coil which should transmit a radio wave such that the loop coil may be connected to the transmission circuit during a time period in which a radio wave is transmitted, said switching control means controlling the other first switching circuits such that the other first switching circuits may be in open states during said time period in which the radio wave is transmitted, said switching control means controlling the second switching circuit such that the output of the second switching circuit may be connected to the signal ground during said time period in which the radio wave is transmitted, said switching control means controlling one of the plurality of first switching circuits corresponding to a loop coil which should receive a radio wave such that the loop coil may be connected to the transmission circuit during a time period in which a radio wave is received, said switching control means controlling the other first switching circuits and the second switching circuit such that the other first switching circuits and the second switching circuit may be in open states during the said time period in which the radio wave is received;

a reception circuit, said reception circuit being connected to the other ends of the plurality of loop coils, said reception circuit detecting voltages induced in the plurality of loop coils; and coordinate calculation means for calculating the coordinate value of the position indicated by the position indicator from voltages induced in the plurality of loop coils.

2. A position detecting apparatus according to claim 1, wherein said plurality of first switching circuits comprise a plurality of three-state drivers whose signal inputs are connected in common to the transmission circuit, and said second switching circuit comprises a three-state driver whose signal input is grounded.

3. A position detecting apparatus according to claim 1, wherein an LC circuit is disposed in series between the other ends of the plurality of loop coils and the second switching circuit.

4. A position detecting apparatus according to claim 3, wherein the parameters of said LC circuit are set such that the resonant frequency of a loop including the LC circuit associated with a transmission time period may be equal to the frequency of the single-polarity pulse signal.

5. A position detecting apparatus according to claim 1, further comprising a third switching circuit, said third switching circuit being connected to the node which connects the other ends of the plurality of loop coils to the reception circuit, said third switching circuit being capable of arbitrarily switching the connection state between a state in which said node is connected to the signal ground and a state in which said node is open, said third switching circuit being switched in the same control manner as the second switching circuit.

6. A position detecting apparatus according to claim 1, further comprising a second transmission circuit, said second transmission circuit outputting a signal whose phase is inverted relative to that of the single-polarity pulse signal during a time period in which a radio wave is transmitted, said second transmission circuit outputting signal ground during a time period in which radio wave is received, wherein said second switching circuit may switch the connection state between a state in which said second switching circuit makes a connection to said second transmission circuit and a state in which said second switching circuit is open.

* * * * *